US 6,547,263 B1

(12) United States Patent
McGeorge et al.

(10) Patent No.: US 6,547,263 B1
(45) Date of Patent: Apr. 15, 2003

(54) COLLAPSIBLE CART AND SHIPPING CONTAINER

(75) Inventors: Todd McGeorge, Pittsburg, KS (US); Bill Holden, Weir, KS (US)

(73) Assignee: Pitsco, Inc., Pittsburg, KS (US)

( * ) Notice: Subject to any disclaimer, the term of this patent is extended or adjusted under 35 U.S.C. 154(b) by 0 days.

(21) Appl. No.: 09/684,997

(22) Filed: Oct. 10, 2000

(51) Int. Cl.[7] .............................. B62B 7/12; B62B 1/00; B65D 5/54; B65D 5/36; B65D 5/00
(52) U.S. Cl. .................. 280/30; 280/47.26; 280/47.131; 280/79.2; 280/639; 229/101.2; 229/117.01; 229/111
(58) Field of Search ..................... 280/47.24, 47.26, 280/47.17, 47.19, 47.131, 79.2, 651, 652, 37, 639, 654, 30; 229/117.13, 101.2, 122, 111, 117.18, 117.01, 108.1, 115; 211/149; 220/8; 206/335

(56) References Cited

U.S. PATENT DOCUMENTS

| | | | |
|---|---|---|---|
| 2,610,071 A | | 9/1952 | Davis et al. |
| 3,087,740 A | * | 4/1963 | Mitty et al. ............... 280/47.26 |
| 3,092,395 A | | 6/1963 | Mitty et al. |
| 3,135,527 A | | 6/1964 | Knapp |
| 3,167,240 A | | 1/1965 | Collura et al. |
| 3,279,811 A | | 10/1966 | Mitty et al. |
| 3,285,620 A | | 11/1966 | Mitty et al. |
| 3,292,942 A | | 12/1966 | Mitty et al. |
| 3,427,040 A | | 2/1969 | Jenkins |
| 3,462,171 A | | 8/1969 | Mitty et al. |
| 3,492,016 A | | 1/1970 | O'Connor et al. |
| 3,493,104 A | | 2/1970 | Tempelhof |
| 3,752,494 A | | 8/1973 | Dunn |
| 4,534,576 A | * | 8/1985 | Jones, Jr. ................. 280/47.26 |
| 5,125,675 A | | 6/1992 | Engelbrecht |
| 5,207,723 A | * | 5/1993 | Newby, Sr. ............ 312/249.11 |
| D352,147 S | | 11/1994 | Dyment et al. |
| 5,628,523 A | | 5/1997 | Smith |
| 5,711,438 A | | 1/1998 | Smith |
| 5,879,022 A | | 3/1999 | Winton |
| 5,906,382 A | | 5/1999 | Walker |
| D421,326 S | | 2/2000 | Lewis |
| 6,036,203 A | * | 3/2000 | Tyus et al. ............... 280/47.26 |
| 6,039,243 A | | 3/2000 | Lickton |
| 6,164,425 A | * | 12/2000 | Latshaw ................... 190/18 A |

* cited by examiner

Primary Examiner—Brian L. Johnson
Assistant Examiner—Gerald Klebe
(74) Attorney, Agent, or Firm—Hovey Williams LLP

(57) ABSTRACT

A convertible cart and container may be assembled by folding a blank of paperboard and attaching a wheeled carriage thereto. The blank includes a floor panel connected to front and back panels along fold lines, the back panel having side panels connected thereto along fold lines. The blank includes a plurality of lines of weakness which facilitate separation of the assembled cart into an upper handle portion which may be discarded and a container portion. The assembled cart conveniently includes an opening in a front panel and a pair of doors which are hinged to the front panel along fold lines to permit access to the chamber within the cart while obscuring the contents from view. The cart includes a top flap portion which may be separated from the upper handle portion and folded over a substantially rectangular box-type container for enclosing items received in the container and permitting shipping of the reduced size container without the need for emptying the contents for conversion.

20 Claims, 2 Drawing Sheets

COLLAPSIBLE CART AND SHIPPING CONTAINER

BACKGROUND OF THE INVENTION

1. Field of the Invention

This invention is concerned with a blank form which can be folded into a cart useful for receiving papers, booklets and small objects and which can be converted into a shipping container. More particularly, the cart may be created by folding a cardboard form, and the contents placed therein may remain while the cart is converted into a shipping container.

2. Description of the Prior Art

Attendees at fairs, conventions and trade shows often accumulate various small objects, brochures and booklets which are given away. As these items accumulate, the recipients may carry the items in plastic, paper or even cloth bags that are provided as promotions. While useful, the bags become quite heavy as the items accumulate. Over the course of a day, the attendee may receive more items than can be carried without considerable fatigue. After the fair, convention or trade show has concluded, the attendee is faced with the task of packing the accumulated material for further review at a later time after returning.

Various hand-drawn vehicles have been developed for carrying purchased items. U.S. Pat. No. 2,610,071 shows a wheeled shopping bag that may be wrapped around a rolling carrier to form a compact package when not in use. U.S. Pat. Nos. 3,087,740, 3,092,395, 3,135,527, 3,279,811, 3,285,620, 3,427,040 and 3,462,171 show corrugated board shopping carts having wheels and which are suitable for pulling behind the user. Similar structures are shown in U.S. Pat. Nos. 5,125,675, 5,628,523 and 5,711,438 showing wheeled trolleys or display stands, while U.S. Pat. No. 6,039,243 shows a collapsible shipping container which is generally tapered toward the top to receive a bag of golf clubs therein and then folds to a smaller size when not in use.

These containers all provide benefits to the user in that they may be constructed of a relatively inexpensive corrugated board and some may initially be formed from a blank. In addition, some of the containers may be folded or rolled to be more compact when not in use. However, it would be desirable to have a cart which could be formed from a blank and be suitable for a first storage use in its expanded state permitting pulling or pushing by a generally erect adult, and then capable of reduction in size to permit shipping of the contents placed therein through the mail or a parcel service. It would also be desirable to have such a cart which would permit easy insertion of articles therein while remaining substantially enclosed. It would also be beneficial to have a cart which is easily converted from a wheeled cart to a storage container. Another desirable feature is to minimize waste and have all of the components of a shipping carton in the blank of the cart.

SUMMARY OF THE INVENTION

These and other desirable features are largely satisfied by the collapsible cart and shipping container of the present invention. That is to say, the invention hereof provides an economical cart which can readily be constructed of a blank of corrugated board which is cut and provided with lines of weakening to permit easy assembly, and which is light in weight. The blank may be stored in a compact condition and then folded for assembly into a cart which is easy to push or pull by an adult standing or walking in an erect position after the insertion of an axle through openings near the bottom panel and attachment of wheels thereto. The assembled cart is substantially enclosed, but includes an opening with doors which swing to permit insertion of items into the cart's interior and then return to maintain the contents hidden. The cart is in a convenient, essentially triangular pyramid which helps keep the center of gravity relatively low and improves the rigidity of the cart. The assembled cart includes lines of weakening which permit removal of portions of the walls of the cart and conversion to a shipping container without the necessity of removing or disturbing the items placed within the cart. The shipping container advantageously includes an integral top flap which folds over to enclose the container. Once the top flap is secured by tape or the like, the converted shipping container is ready for dispatch.

More particularly, the collapsible cart of the present invention is constructed from a precut and perforated blank, preferably of corrugated board. The single blank includes a floor panel with a rear panel and a front panel extending therefrom, each of the rear panel and front panel including a plurality of transversely extending fold lines. In addition, the blank includes side panels which extend from one of the front and back panels. In the embodiment illustrated, the side panels are generally triangular and extend from opposite rear fold lines of the rear panel to form side walls when the collapsible cart is constructed. The lower side panels have respective holes to receive an axle therethrough. The side panels are then folded along longitudinally extending fold lines and the front panel and rear panel are folded along transverse fold lines whereby a collapsible cart is shaped and retained in that configuration by the insertion of tabs on the front panel into corresponding slots in the side panels. After the blank is folded, an axle is inserted through the holes and wheels are attached to the ends of the axle exteriorly of the folded blank to form a cart with an integral, handle and handhold.

The front panel presents at least one and preferably a pair of doors which swing along fold lines to permit the insertion of items into the cart. Items inserted through the opening are retained in the cart and normally fall to a natural position of repose in the bottom. Items are normally not visible in the interior of the cart because the doors tend to return to a position blocking the opening.

Beneficially, the blank and the resulting cart include a number of lines of weakness made by scoring or perforations which permit the cart to be converted to a shipping container of a convenient size. Because the items naturally tend to fall to the bottom, the configuration of the cart and positioning of the lines of weakness avoids the need to remove the items within the cart for conversion to a shipping carton. Portions of the back panel and side panels are removed from the lower portions so that a box with a lid is provided. Upon removal of the axle and wheels and folding of the lid to enclose the item-receiving chamber, the cart is converted to a shipping container of a more convenient size and configuration, which may be shipped with excess charges due to size or bulky configuration by most shipping services or return with the user as checked airline baggage. In this way, an attendee at a trade show may obtain the use of an inexpensive cart in which to place and temporarily store items received at the show, the cart being rollable to minimize strain on the user. At the conclusion, the cart may be quickly converted to shipping container either at an airport or at a parcel shipping service.

DESCRIPTION OF THE PREFERRED EMBODIMENT

Figure 1:
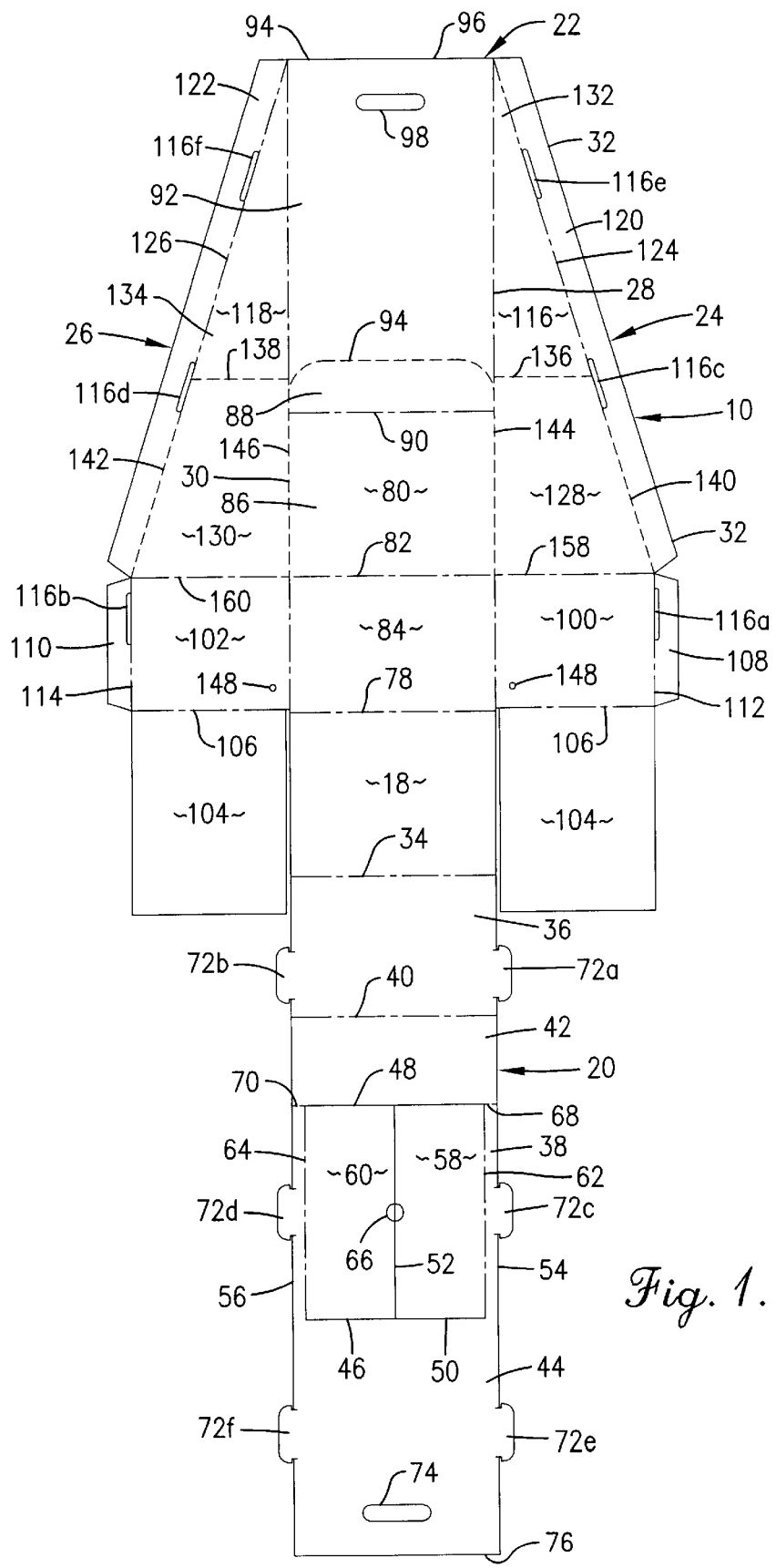
FIG. 1 is a plan view of a blank prior to folding showing the various panels, fold lines and cut lines forming the preferred blank.
Figure 2:
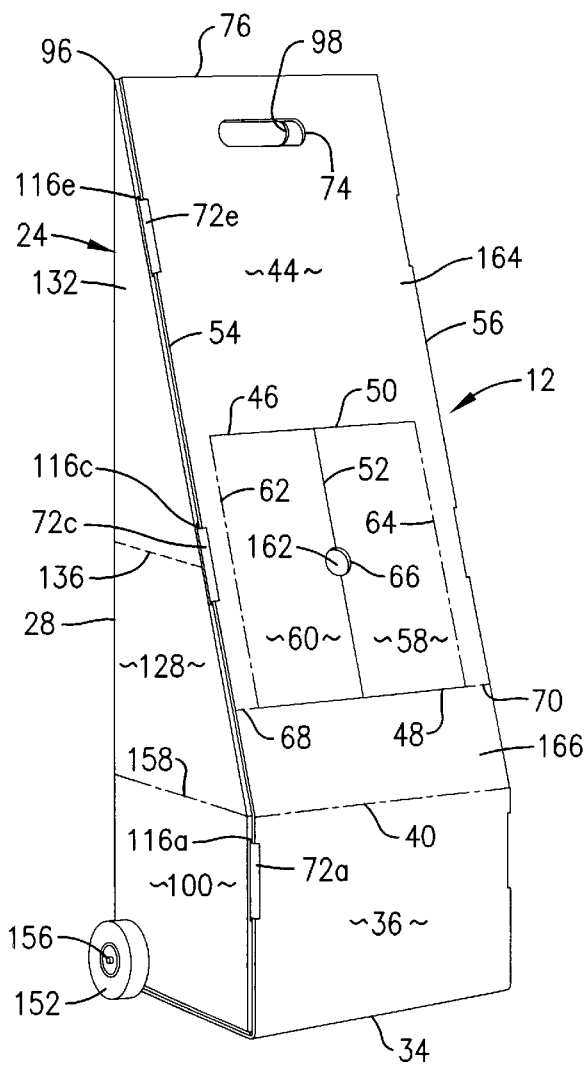
FIG. 2 is a left front perspective view of the convertible cart hereof after the blank has been folded and the wheels and axle attached and the swinging doors in covering relationship over the opening at the front of the cart.
Figure 3:
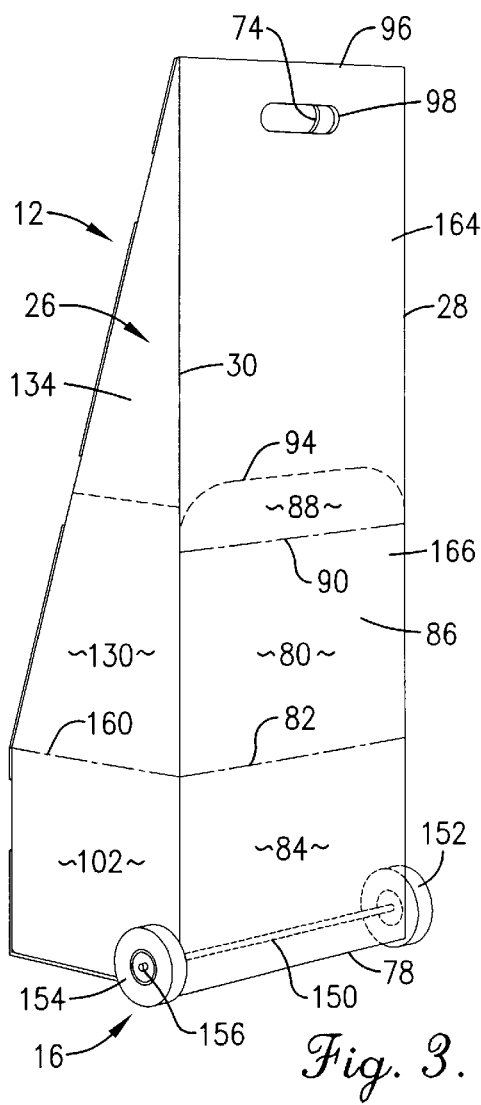
FIG. 3 is a right rear perspective view of the convertible cart hereof and assembled as shown in FIG. 2, showing the fold and perforation lines of the flaps of the side panels and the rear flap.
Figure 4:
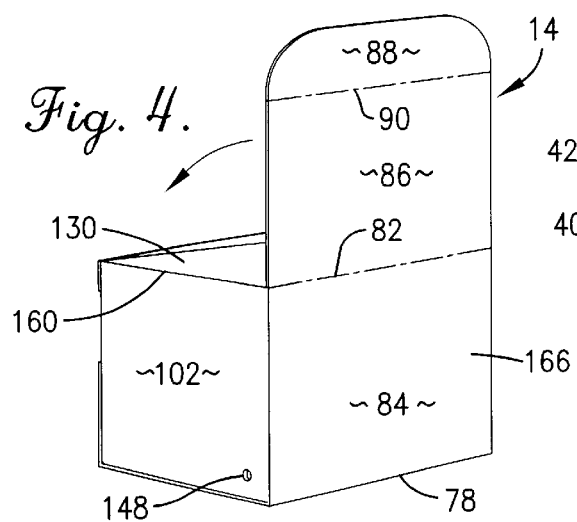
FIG. 4 is a left rear perspective view after removal of portions of the front panel, back panel and side panels removed along lines of weakening and removal of the axle and wheels to convert the cart to a shipping container.
Figure 5:
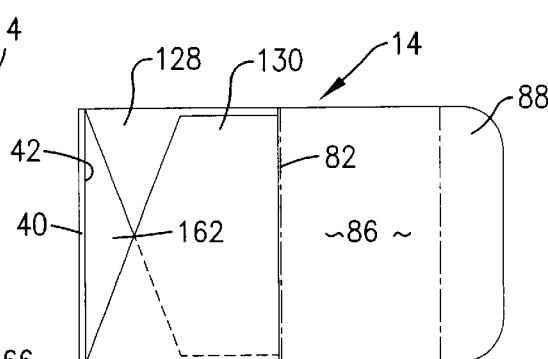
FIG. 5 is a top plan view of the shipping carton of FIG. 4 with the top flap folded rearwardly prior to closure or after opening to gain access to the items placed in the carton.

Referring now to the drawing, FIG. 1 shows a blank 10 useful in constructing the cart 12 shown in FIGS. 2 and 3 which may then be converted into the shipping container 14 shown in FIGS. 4 and 5. The blank 10 is preferably provided of corrugated board which is inexpensive and provides the desired qualities of rigidity, ability to be cut, scored, perforated or folded, and lightness of weight. However, it may be appreciated that other materials with similar properties may be employed. In FIGS. 1, 2 and 3, solid lines on the interior of the blank 10 or the assembled cart 12 indicate cut lines extending through the material, alternating long and short dashes indicate fold lines, and the use of dashes of the same size indicates a line of weakening created by perforation or scoring to facilitate separation therealong. A wheeled carriage 16 is attached to the folded blank 10 to provide the cart 12.

The blank 10 is initially provided as a flat sheet of paperboard such as corrugated board to permit a multiplicity of such blanks to be shipped and stored in a relatively small space. The blank 10 includes a floor panel 18, a front panel 20, a rear panel 22 and first and second side panels 24 and 26 connected to the rear panel 22 along respective first side panel fold line 28 and second side panel fold line 30. The blank 10 is cut into a shape having an irregular outer perimeter 32.

In greater detail, the front panel 20 is hingedly connected to the floor panel 18 along a front floor fold line 34. The front panel 20 includes a front container panel 36 adjacent the front floor fold line 34 and a front handle panel 38 connected to the front container panel 36 along a transverse upper front fold line 40 which is substantially parallel to front floor fold line 34. The front container panel forms the front wall of the container 14 after folding. The front handle panel 38 further includes a boxing panel 42 and an opening panel 44. An opening 46 is provided by a plurality of cuts in the opening panel 44. The cuts may be in a variety of shapes to provide the opening, including arcuate, but in the embodiment illustrated a plurality of substantially linear cuts are used and include a transverse bottom cut 48, a transverse top cut 50, and a longitudinally extending center cut 52 extending therebetween and preferably located midway between the side margins 54 and 56 of the front panel 20. Also, the cuts 48 and 50 have a transverse orientation as viewed in FIG. 1 but do not extend to the side margins 54 and 56, whereby the opening 46 is internal to the outer perimeter 32. The cuts 48, 50 and 52 both define two saloon-type doors 58 and 60 which are hingably mounted to the opening panel 44 along longitudinally extending hinge lines 62 and 64, but together with the hinge lines 62 and 64 define the dimensions of the opening 46 when the doors swing on the hinge lines 62 and 64. The corrugated board retains a memory as to the initial position of the doors 58 and 60 whereby they are biased to return to the closed position. A circular cut 66 is provided on the center cut 52 midway between the cuts 48 and 50 to permit removal of the corrugated board material therewithin and thereby provide a fingerhole to assist in opening the doors 58 and 60. The lower cut 48 is aligned with lines of weakness 68 and 70 formed by perforations or alternatively scoring, the lines of weakness 68 and 70 extending between the lower cut 48 and the respective side margins 54 and 56 and are located between the boxing panel 42 and the opening panel 44. The front panel 20 further includes a plurality of transversely extending tabs 72a, 72b, 72c, 72d, 72e and 72f along each of the side margins 54 and 56 of the front panel 20. An ovoid front handle cutout 74 is provided in the opening panel 44 proximate the top margin 76.

The back panel 22 is elongated and is hingably connected to the floor panel 18 by a back floor fold line 78 oriented substantially parallel to the front floor fold line 34. The back panel 22 further includes a top flap portion 80 hingably connected by a transverse top panel fold line 82 to back container panel 84 which forms the back wall of the container 14 after folding. The top flap portion 80 includes a top wall portion 86 and a sealing flap panel 88 connected to the top wall portion 86 along a transverse sealing flap fold line 90. The back panel 22 further includes a back handle panel 92 connected to the sealing flap panel 88 of the top flap portion 80 along a line of weakness 94 provided by perforations or alternatively scoring of the corrugated board. The back handle panel 92 has a top edge 96 substantially parallel to the top edge 76 and includes a back handle cutout 98 similar to front handle cutout 74 and located proximate the top edge 96.

The first and second side panels 24 and 26 are connected to the rear panel 22 along the first and second side panel fold lines 28 and 30 and are essentially mirror images of one another. Each side panel 24 and 26 includes a respective side container panel 100 and 102 to which an interior floor panel 104 is hingably connected along an interior floor panel fold line 106. Each side panel 24 and 26 further includes a respective side securement flap 108 and 110 hingably connected to its side container panel along a respective side securement flap fold line 112, 114. The side securement flaps each include a cutout along the flap fold lines 112, 114 defining a slot 116a and 116b sized and located for receiving the tabs 72a and 72b, respectively, therein. Further, the side panels 24 and 26 include respective handle sidewalls 116 and 118 each having a respective handle securement flap 120, 122 connected thereto along a diagonal fold line 124, 126. The handle sidewalls 116 and 118 each have a cutout defining a slot 116c, 116d, 116e, and 116f located along the diagonal fold lines 124 and 126 which are sized and positioned to respectively receive tabs 72c, 72d, 72e, and 72f in locking engagement therewith. The handle sidewalls 116 and 118 include respective trapezoidally shaped top cover flaps 128 and 130 and triangular upper handle side panels 132 and 134 separated by transversely extending lines of weakening 136 and 138, preferably formed by perforations. As illustrated in FIG. 1, the portion of the diagonal fold lines 124 and 126 adjacent the cover flaps 128 and 130 is perforated to provide diagonal weakened line segments 140 and 142, and the portion of fold lines 28 and 30 adjacent the top cover flaps 128 and 130 are similarly perforated to provide top flap weakened line segments 144 and 146. The side container panels 100 and 102 each present a hole 148 proximate the respective side panel fold lines and the interior panel fold lines 106. The top cover flaps 128 and 130 are separable from their respective side container panels by fold lines The wheeled carriage 16 includes a wood or more preferably metal axle 150 onto which wheels 152 and 154 may be rotatably mounted. Friction caps 156 or other fasteners may be used to cover the ends of the axle 150 and hold the wheels 152 and 154 in place, or the wheels may simply press fit onto the axle.

To form the cart 12 from the blank 10 and the wheeled carriage 16, the user folds the back panel 22 along back floor fold line 78 until it is essentially perpendicular to the floor panel 18. Side panels 24 and 26 are folded along their first and second side panel fold lines 28 and 30 into facing relationship in substantially parallel planes. The front interior floor panels 104 are then folded along their interior floor panel fold lines 106 to an overlapping position and also overlying the floor panel 18. The side securement flaps 108 and 110 are folded into opposing relationship and handle securement flaps 120 and 122 are also folded into opposing relationship.

The front panel 20 is then folded upwardly opposite the back panel 22 along front floor fold line 34. The front container panel 36 remains parallel to the back container panel 84 and tabs 72a and 72b are inserted into slots 116a and 116b. The front handle panel 38 is further folded to incline toward back panel 22 along transverse upper fold line 40. Tab 72c is inserted into slot 116c, tab 72d is inserted into slot 116d, tab 72e is inserted into slot 116e, and tab 72f is inserted into slot 116f, whereby top margin 76 is adjacent top edge 96 and front handle cutout 74 is in registry with back handle cutout 98. So assembled, a chamber 154 is provided inside the front panel 20, rear panel 22, side panels 24 and 26, and the floor panel 18. The axle 150 is then inserted through holes 148, the wheels 152 and 154 are mounted outboard of the side container panels 100 and 102, and the caps 156 are positioned on the ends of the axle 146 to hold the wheels in place. The bottom panel 18 thereby forms the bottom wall of the cart 12, the front panel 20 forms the front wall of the cart 12, the back panel 22 forms the back wall of the cart 12, and the side panels 24 and 26 form the side walls of the cart 12 with the interior floor panels 104 thereof folded along fold lines 106 over the floor panel to provide reinforcing for the bottom panel 18. The cart 12 is then ready for use, whereby the user may grasp the handle cutouts while standing erect and push or pull the cart along on its wheels. Items collected by the user may be inserted by pushing on the doors 58 and 60 which swing open to permit items to be placed in the chamber 162, and then swing back to block the opening 46. When so assembled, the cart 12 thus presents an upper handle portion 164 separable from a lower container 166 portion along the lines of weakness as described below.

When the user is through collecting items and is ready to ship the contents, the cart 12 is readily converted into a container 14. This is accomplished by first disengaging the tabs 72c–72f from locking engagement with their respective slots 116c–116f. The handle securement flaps 120 and 122 are then removed from the top cover flaps 128 and 130 along diagonal weakened line segments 140 and 142. The top cover flaps are separated from the triangular upper handle side panels 132 and 134 along transversely extending lines of weakening 136 and 138. The top cover flaps are separated from the top flap portion 80 along top flap weakened line segments 140 and 142 which is inturn separated from the back handle panel 92 along line of weakness 94. The front handle panel 38 is then separated from the boxing panel 42 along lines of weakness 68 and 70. Separation along each line of weakness may be readily accomplished by use of an ordinary pen knife, scissors, or by tearing therealong. The wheels 152 and 154 and axle 150 are removed from the remaining portion of the cart 12.

The container is closed by folding the boxing panel 42 downwardly over the contents of chamber 162 or fully forward to be parallel to the front container panel 36 if desired. Thereafter, the top cover flaps 128 and 130 are folded along cover flap fold lines 158 and 160 and over one another as shown in FIG. 4. The top wall portion 86 is then folded down onto the remaining uppermost edges of the front container panel 36 and side container panels 100 and 102, whereby the sealing flap panel 88 is then folded and either tucked into the chamber behind the boxing panel 42 or alternatively, if desired or if the boxing panel 42 is unable to be tucked behind the front container panel 36, the sealing flap is placed on the outside of the front container panel 36 and secured by tape or the like to enclose the contents of the chamber 154 in a condition ready for shipping.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the sidewalls may be provided instead on the front panel and the slots and tabs may be reversed whereby the tabs are provided on the rear panel and the slots provided in the front panel.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. A convertible cart and shipping container comprising:
   a wheeled carriage assembly; and
   a cart body supported on said wheeled carriage for rolling therewith, said cart body defining therein and substantially enclosing a chamber, said cart body comprising:
      a floor, a pair of upright sidewalls, an upright back wall, and a front wall,
      said front wall including a lower segment and an upper segment unitary therewith and separated by a fold line, said upper segment being angled from said fold line rearwardly toward said back wall,
      said upper segment including an opening therethrough providing access to said chamber and at least one door hingedly connected to said upper segment for covering the opening and for permitting insertion of items through said opening into said chamber.

2. A convertible cart and shipping container as set forth in claim 1, wherein said body is provided of corrugated board.

3. A convertible cart and shipping container as set forth in claim 2, wherein said body is a unitary member folded to provide said floor, upright sidewalls, upright back wall and front wall.

4. A convertible cart and shipping container as set forth in claim 3, wherein said front wall includes a plurality of tabs and the side walls include a plurality of corresponding slots sized and positioned for receiving said tabs in mating engagement.

5. A convertible cart and shipping container as set forth in claim 3, wherein said back wall includes a line of weakness extending generally transversely for dividing said back wall into a flap portion and a handle portion separable therefrom along said line of weakness.

6. A convertible cart and shipping container as set forth in claim 3, wherein said front wall includes respective first and second side margins and said opening is positioned intermediate and not contiguous with said side margins.

7. A convertible cart and shipping container as set forth in claim 6, wherein said opening includes a cut line through said corrugated board, said cut line not extending to said side margins, and first and second lines of weakness substantially colinear with said cut line and extending to said side margins of said front wall.

8. A convertible cart and shipping container as set forth in claim 3, wherein said front wall and back wall each include an upper margin adjacent one another, and include a handle cutout in each of said front wall and back wall adjacent their respective margins and in registry with one another.

9. A convertible cart and shipping container comprising:
a cart body; and
a wheeled carriage assembly removably coupled to said cart body;
said cart body having a chamber for receiving articles therein and including an initially unitary lower container portion and an upper handle portion separable from each other along a line of weakening for thereby converting said cart into a shipping container.

10. A convertible cart and shipping container as set forth in claim 9, wherein said cart body is provided of corrugated board.

11. A convertible cart and shipping container as set forth in claim 10, wherein said lower container portion includes four upright substantially perpendicular container panels, a floor panel, and a top flap portion hingably connected to one of said container panels along a fold line, whereby after separation of said lower container portion from said upper handle portion along said lines of weakness, said top flap portion may be folded along said fold line to substantially enclose the portion of said chamber interior to said container panels.

12. A convertible cart and shipping container as set forth in claim 11, wherein a hole is provided in each of two parallel ones of said container panels for coupling said wheeled carriage assembly to said cart body.

13. A convertible cart and shipping container as set forth in claim 9, wherein said cart body includes a floor panel, and a front panel connected to the floor panel along a first fold line, a back panel connected to the floor panel along a second fold line substantially parallel to said first fold line, and a pair of opposed side panels respectively connected to said back panel along second and third fold lines, each of said front panel, back panel and side panels including at least one of said lines of weakening for permitting separation of said lower container portion from said upper handle portion.

14. A convertible cart and shipping container as set forth in claim 13, wherein said front panel and back panel include respective top margins positioned adjacent one another prior to separation of said lower container portion from said upper handle portion.

15. A convertible cart and shipping container as set forth in claim 13, wherein said front panel includes an opening therein and at least one door hingably coupled to said front panel for permitting access therepast into the chamber.

16. A convertible cart and shipping container comprising:
a wheeled carriage assembly; and
a body removably mounting said wheeled carriage assembly, said body including
a floor panel, a first container panel and a second container panel unitary with said floor panel and connected thereto along fold lines, a pair of opposed side container panels unitary with said first and second containers panel and connected thereto along respective fold lines, said body further including side panel extensions unitary with each one of said pair of side container panels and extending away from said floor panel, said second container panel including a top flap portion unitary therewith and hingably connected thereto along a top flap fold line, a first container panel extension unitary with said first container panel and extending away from said floor panel, and a second container extension panel unitary with said second container panel and said top flap portion and extending away from said floor panel whereby said first and second container extension panels are convergent toward a top edge to enclose a first volume within said body,
lines of weakness positioned between the respective side container panels and side panel extensions;
a line of weakness positioned between the first container panel and the first container panel extension; and
a line of weakness positioned between the top flap portion and said second container panel extension,
whereby, upon removal of said wheeled carriage and separation of said side panel extensions, said first container panel extension and said second container panel extension, said top flap portion may be folded along said hinge line to cover said floor panel, first and second container panels, and said side container panels and thereby convert to a shipping container and enclose therein a chamber having a volume less than said first volume.

17. A convertible cart and shipping container as set forth in claim 16 wherein said cart body is provided of corrugated board.

18. A convertible cart and shipping container as set forth in claim 16 wherein one of first and second container panels includes a plurality of tabs and side container panels include a plurality of corresponding slots sized and positioned for receiving said tabs in mating engagement.

19. A convertible cart and shipping container as set forth in claim 16 wherein one of said first and second container panel extensions includes an opening therein and at least one door hingably couples to said container panel extension for permitting access therepast into the chamber.

20. A convertible cart and shipping container as set forth in claim 16 wherein said first and second container panels extensions each include an upper margin adjacent on another, and include a cutout in each of said first and second container panels adjacent their respective margins and in registry with one another.

* * * * *